(12) United States Patent
Rainer et al.

(10) Patent No.: US 7,662,440 B2
(45) Date of Patent: *Feb. 16, 2010

(54) PROCESS FOR MARKING OBJECT SURFACES

(75) Inventors: Thomas Rainer, Wernigerode (DE); Klaus-Jürgen Berg, Halle (DE); Frank Redmann, Halle (DE)

(73) Assignee: Boraident GmbH, Halle/Saale (DE)

( * ) Notice: Subject to any disclaimer, the term of this patent is extended or adjusted under 35 U.S.C. 154(b) by 489 days.

This patent is subject to a terminal disclaimer.

(21) Appl. No.: 11/445,979

(22) Filed: Jun. 2, 2006

(65) Prior Publication Data

US 2006/0272532 A1 Dec. 7, 2006

(30) Foreign Application Priority Data

Jun. 3, 2005 (DE) .................. 10 2005 026 038

(51) Int. Cl.
*B05D 3/00* (2006.01)
*C08J 7/18* (2006.01)
*G21H 5/00* (2006.01)

(52) U.S. Cl. .................................. 427/554

(58) Field of Classification Search .............. 427/553, 427/554, 249.7
See application file for complete search history.

(56) References Cited

U.S. PATENT DOCUMENTS

| 5,308,737 | A | 5/1994 | Bills et al. | |
|---|---|---|---|---|
| 6,177,151 | B1 | 1/2001 | Chrisey | 427/596 |
| 6,822,189 | B2 | 11/2004 | Hong | 219/121.69 |
| 2009/0104436 | A1* | 4/2009 | Berg et al. | 428/328 |

FOREIGN PATENT DOCUMENTS

| DE | 221401 | 4/1985 |
|---|---|---|
| DE | 4126626 | 2/1992 |
| DE | 4407547 | 9/1995 |
| DE | 69405521 | 4/1998 |
| DE | 19855623 | 2/2000 |
| DE | 19841547 | 3/2000 |
| DE | 10162119 | 12/2001 |
| DE | 10119302 | 10/2002 |

(Continued)

OTHER PUBLICATIONS

German Search Report dated Dec. 13, 2005.

(Continued)

*Primary Examiner*—Roberts Culbert
(74) *Attorney, Agent, or Firm*—Andrew Wilford

(57) ABSTRACT

The invention relates to a process for the marking of an object surface, wherein there is arranged in contact with, or a distance away from the object surface a carrier element, featuring on its side facing the object surface at least one metal coating embedded in other layers, whereby the layers in particular form a Low-E coating system and whereby a laser beam is directed onto the coating system and by reason of the laser irradiation material is transferred from the coating system onto the object surface to be marked, adhering thereto as a matrix with metallic nano-particles, whereby the matrix is formed of the substances originally present in the layers of the coating system. The invention furthermore relates to an object with an object surface marked according to this process.

9 Claims, 3 Drawing Sheets

FOREIGN PATENT DOCUMENTS

| | | |
|---|---|---|
| DE | 10250408 | 5/2004 |
| EP | 0658443 | 12/1994 |
| EP | 0864118 | 8/2000 |
| EP | 1110660 | 6/2001 |
| WO | 03/049978 | 6/2003 |

OTHER PUBLICATIONS

"Electroluminescence from CdSe microcrystals-doped indium tin oxide thin films" M. Hayashi et al, Kluwer Academic Publishers 1998.

"Ion beam assisted formation of AG nanoparticles in $SIO_2$ and their optical properties" M. Nicolaeva et al, Elsever Sience B.V., 2002.

"Influence of matrix on third order optical nonlinearity for semiconductor nanocrystals embedded in glass thin films prepared by Rf-sputtering" H. Nasu et al, Elsevier B.V., 2005.

"Effects of heat treatment on AG particle growth and optical properties in $Ag/SIO_2$ glass composite thin films" I. Tanahashi et al, Materials Research Society, 1995.

\* cited by examiner

PROCESS FOR MARKING OBJECT SURFACES

RELATED APPLICATIONS

The present invention claims all rights of priority to German Patent Application No. 10 2005 026 038.1, filed on Jun. 3, 2005, which is hereby incorporated by reference.

FIELD OF THE INVENTION

The invention concerns a process for the marking of object surfaces.

BACKGROUND OF THE INVENTION

In the state of the art, marking of objects is known in a variety of forms. Known processes (DE 4126626, DE 4407547, DE 19855623) for the marking of glass utilize, for example, the creation of micro-fissures inside the glass, taking advantage of non-linear processes within the focal range of laser beams to which the glass is transparent. Such micro-fissures scatter and absorb light from the visible spectral range and are therefore visible to man. Due to the formation of local cracks, these processes weaken mechanical stability and are for this reason not advantageous, especially with very thin glass.

No such mechanical damage occurs with the method of ionic color lettering, by which thanks to a locally circumscribed heating of the glass due to the absorption of laser beams, nano-particles of gold, silver or copper are produced within the glass, lending the glass a red color (from gold and copper) or a yellow color in the case of silver. The drawback of these processes lies in the fact that they can only be employed with glass already embedded with gold, silver or copper ions in the melting process (patent disclosure DE 19841547 A1) or in which in a supplemental stage of the process prior to exposure to laser radiation, Na ions of the glass surface are substituted by way of an ion exchange with silver or copper ions from a molten salt bath in contact with the surface of the glass. In either case, the glass must in addition contain ions which when exposed to thermal action reduce the ionic gold, silver or copper to atoms, before the same are separated as nano-particles on account of their limited solubility in glass.

Patent disclosure DE 10119302 A1 describes how the supplemental process prior to exposure to laser radiation can be obviated by placing the portion of the glass surface in need of lettering during the exposure to laser radiation in contact with a silver or copper ion donor medium. In such a case, the processes required for the production of metallic nano-particles lending the color to the glass, the ion exchange and diffusion of silver or copper ions in the glass, their reduction to atoms and aggregation into nano-particles now take place almost simultaneously during the exposure to laser radiation.

Patent disclosure DE 102 50 408 A1 suggests coatings as donor media for silver ions, along with their composition, the processes for the production of such coating compositions and the coating process. The compositions described therein contain at least one silver compound soluble in an aqueous and/or organic solvent and at least one bonding agent. The application of the coating and the required rinse upon completion of the laser radiation are still a drawback, though a less weighty one compared to the complete ion exchange process phase with the molten salt bath.

Patent DE 101 62 119 describes a process wherein, save for the laser radiation, no other steps are needed to apply a durable marking onto a transparent structure. The marking is spaced away from the surface and consists in the mechanically undamaged material solely of a region with a complex refractive index altered vis-à-vis the original state and detectable by optical processes including the naked eye. The changes in the complex refractive index are produced by non-linear optic effects of excitation in elevated power density ranges within the focus of the laser beam, consisting of ultra-short pulses, using for example a Ti:Saphire laser.

SUMMARY OF THE INVENTION

The task of the invention is to make available a process for marking any and all object surfaces, including non-transparent ones, placing no further special requirements on the material to be so marked.

The task is resolved in that in contact with or spaced away from the object surface a carrier element is arranged featuring on the side facing the object surface at least one metal coating embedded in other coatings, whereby such coatings in particular form a Low-E system of layers, in that a focused laser beam, in particular, is directed onto the system of coatings and that thanks to the radiation of the laser beam, material is deposited from the system of coatings onto the object surface to be marked, bonding there as a matrix with the metal nano-particles, whereby the matrix is formed of the substances originally embedded in the layers of the stratified system, whereby it is not imperative for the matrix to incorporate all substances present in the coatings surrounding at least one metallic layer.

DETAILED DESCRIPTION OF THE INVENTION

Figure 1A:
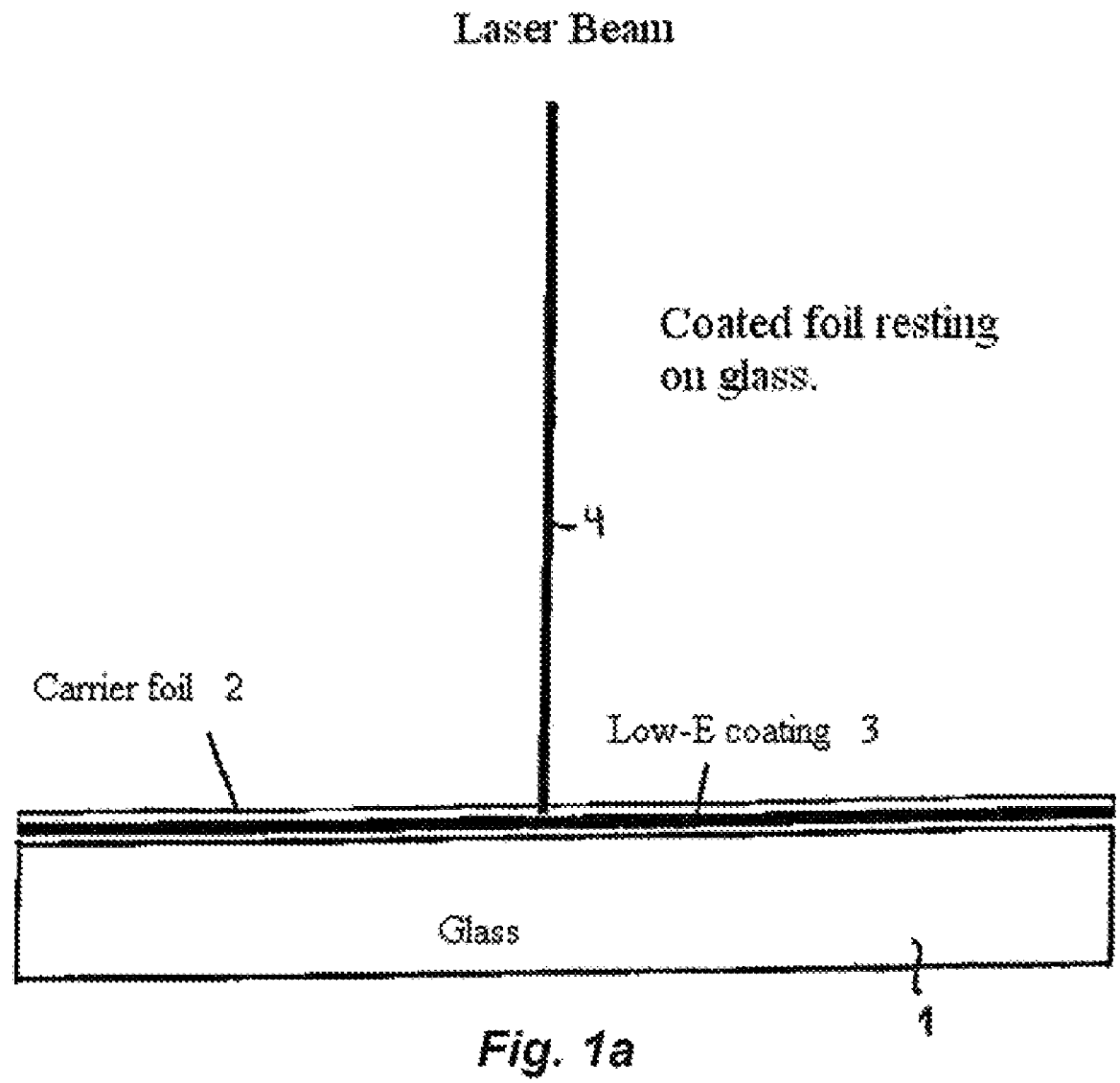
FIG. 1a show an exemplary embodiment of the disclosed inventions.

In the irradiation of a system of coatings wherein a metallic layer is embedded, a color marking is produced in the stratified layer occasioned by a process in which an aggregation of metallic nano-particles is produced in the system of coatings, embedded in a matrix from the substances surrounding the original metal layer.

Apart from this configuration of such a marking by aggregation within the system of coatings, this marking and/or at least a portion of such aggregation can also be transferred upon any other surface at will in contact with the system of coatings or spaced immediately ahead of it.

The carrier element may, for example, feature a so-called Low-E coating. Such coatings are ideally suited to the implementation of the process since they feature metal layers embedded in other coatings, whereby the other coatings essentially serve the purpose of protection and suppression of reflections. Suitable for such applications are, for example, tin dioxide, zinc oxide, bismuth dioxide and indium (III) oxide. Accordingly, the matrix materials may be formed from these substances.

With an elevated transmission rate in the visible portion of the spectrum within the infrared spectral range, these Low-E coatings and coating systems possess high reflexivity and the correlated low emissivity (Low-E). Therefore, they act as good reflectors of thermal radiation at ambient temperatures, lending glass and transparent polymer foils very good heat insulation, which they would not possess in the absence of such a coating.

Typical representatives are layers of $In_2O_3$:Sn(ITO) and silver-based multiple coating systems.

Coating systems are dominant in the area of architectural glass. In most cases, a silver coating barely 10 nm thick forms a functional base and to preserve the transparency of the glass in the visible spectral range, the silver is made anti-reflective by embedding in oxides highly refractive at these wavelengths. To this end, use is mostly made of tin dioxide, but also of zinc oxide, bismuth dioxide and indium (III) oxide. Beyond that, there is need for so-called blocker coatings to prevent corrosion of the silver layer and in virtually every application, external cover coatings are provided to enhance scratch resistance of the coating system.

The system of coatings is vacuum-produced by magnetron sputter, whereby float glass in the format of 3.21 m width by 6 m length is coated on the so-called fire or atmosphere face. Similar coating processes are used for polyethylene terephthalate (PET) foil in thicknesses between 25 and 100 µm and sizes for ex. 2.15 m width by 9 m length.

In terms of the Low-E coating as the preferred variant of the invented process, only the Low-E layers must be brought in contact with the substrate or in the immediate proximity thereof, after which the laser beam is directed onto the system of coatings, in particular through the carrier material of the Low-E coating system, as for example float glass or PET foil.

In the event that the object to be coated is absorption-free at this wave length of the laser, or sufficiently low in absorption, the laser beam may also be directed onto the Low-E coating system through the object. In a number of applications, it may also be valuable that there is no need for the Low-E system and the substrate to be in direct contact.

Even at a distance of 150 µm, the transferred structures exhibit no material loss of sharpness as compared to the "originals" on the Low-E coating system. In this respect, when the contact is direct, there is virtually no detectable difference between the "original" and the transferred structure.

A special advantage accrues from the use of the coating system on PET foil carrier material, for example, in thicknesses of just 25 to 100 µm, since these structures can then be transferred even onto warped solid surfaces.

The cause for the creation of colored structures on Low-E coating systems goes back to the absorption of laser radiation in at least one metallic coating, for example a silver coating, which is thereby heated to such an extent as to cause a change in the coating system inside the irradiated region. As a result of the alteration, the metal, for example silver, is now embedded in the form of nano-particles in a matrix, created at least in part from the substances originally present in the coating system.

Such embedded nano-particles of metal, for example silver, display a color depending on the size, concentration and distribution of the particles as well as the refraction index of the resulting matrix material. In the presence of high particle concentrations, it is also possible to observe a supplemental selective reflection in the visible range of the spectrum. In this case, the cited parameters are all a function of the radiation conditions and the concrete build-up of the coating system. In this manner, the coloring of the irradiated ranges can be varied in transmission between light yellow and dark brown. The reflection effect is dominant when the irradiated areas are observed at an angle, where they gain the appearance of vaporized metal coatings.

Up until now, there has been no mention in the literature of metallic nano-particles produced from at least one coherent metal coating, let alone in a single very brief procedural step utilizing laser radiations, nor could the same be anticipated on the basis of known manufacturing processes.

What emerges from the process here is that in parallel with the formation of color-yielding particles, the material in the Low-E coating system is "directionally" evaporated, depositing lastingly even upon highly differentiated substrates, such as glass, ceramics or aluminum, a matrix containing metal particles of virtually the same composition as the one retained on the carrier material of the Low-E coating system.

The coating thickness of these colored structures or markings depends on the conditions of radiation, lying on the order of 30 nm. Just as in the case of the silver-based Low-E system, it is possible by varying the conditions of radiation to produce on transparent substrates colors ranging from light yellow to dark brown, whereby reflection is again dominant when the irradiated areas are observed at an angle, so that they give the appearance of vaporized metal coatings. In the case of non-transparent substrates, the impression given by colored structures is essentially co-determined by the color and the roughness of the substrate itself.

The colored structures imparted by laser radiation on solid surfaces are stable to water, common household chemicals and solvents as well as UV radiation, even after very long exposures, and resistant to temperatures up to 550 deg. C. Above that, color changes set in, without altering the shape of the structures.

Thus, in an advantageous embodiment of the invention, the color of a marking transferred onto a marking object and/or its surface, may be changed even after transfer, in that the marking object is subjected to a temperature treatment.

In a preferred embodiment, a beam having a Gaussian intensity profile of a pulsed Nd:YAG laser is focused onto a Low-E system of coatings in immediate contact with a solid surface. With even just one single pulse of 200 ns duration and an energy of 0.4 mJ it is possible to produce a colored circular surface (pixel), in particular one delimited by a circle of a color shade deviating from the one of the surface. Its diameter may be varied for example from less than 10 µm up to 100 µm depending on the degree of focusing of the laser beam. The color may be changed by the effect of repeated further pulses upon the same surface.

By way of their relative movement between the laser beam and the coating system and/or object, the colored pixels may be composed at will into markings, lettering, decorative structures and half-tone images, whereby these structures may also be color-structured within themselves.

If surfaces are composed of individual pixels of a macroscopically uniform appearance, it is possible to vary the appearance by a reciprocally variable arrangement of the pixels.

The color impression made by a surface composed of non-overlapping pixels is different from the one created by overlapping pixels.

Similarly, it is possible to construct surfaces of a macroscopically uniform appearance from lines of a greater or lesser degree of overlap and thereby a different appearance. The microscopically observable color of the lines is in turn affected by the degree of the pixel overlap, in other words the relative velocity between the solid surface and the laser beam, as well as the pulse frequency and most substantially the intensity of the beam.

There are coating systems of a composition very similar to that of the silver-based Low-E coating systems, but not uniformly named as such, even though they do feature a very high reflection in the infrared spectral range. They are more or less strongly tinted and are not primarily designed for thermal insulation, but rather as a sun screen and are for this reason often given different designations. For example, the firm of Southwall Europe markets such stronger-tinted coating systems on PET foil, calling them for example Solar-Control Foil Products. Such coating systems and/or the carrier elements containing the same may also be used for color structuring of solid surfaces.

Basically, it should be noted that the use of Low-E coating systems on suitable carriers such as foil or glass constitutes a possibility within the framework of the invented process, in that such coating systems are readily available in commerce.

Nevertheless, the usable coating systems for the invention, particularly on rigid or flexible carrier elements, are those which feature at least one metal layer embedded in additional coatings, such as for example tin dioxide, zinc oxide, bismuth oxide etc. out of which the matrix material is then constructed under laser beam treatment, wherein it is also possible to make provision for several coatings of different metals within a coating system, lending themselves in particular to additional color shades.

Thus, it is possible especially for color structuring to provide foil or glass with coating systems containing metal layers other than silver, for example copper layers, which on a par with gold coatings are capable of producing a red tint on the surface, for example of transparent solids.

An exemplified embodiment of the invention is illustrated in the following FIG. 1a.

FIG. 1a shows a glass 1 to be provided with a marking, upon which there is arranged a carrier element 2, for example a foil bearing on the side facing the glass a coating system 3, featuring at least one metal layer. Concretely, what is involved is a Low-E coating system with a silver layer.

The laser beam 4 is directed through the carrier element onto the coating system where it is absorbed in the silver layer, creating silver nano-particles embedded into a matrix formed of the remaining coating materials. Along with the formation of such an aggregation in the coating system, at least a portion of the aggregation is transferred by laser radiation onto the glass surface to be marked.

Materials or objects suitable for marking are in particular, for example, aluminum objects, ceramics, and curvilinear objects as for example glass ampoules.

Additional examples of embodiment, essentially related to just one carrier with a Low-E coating system, are illustrated in additional FIGS. 1 to 5. The further data given therein are also applicable to markings obtained when the marking transfer is effected from such a coating system onto any surface at will according to the invention.

In the initial exemplified embodiment, a Low-E coating system is utilized as the starting material applied onto the atmospheric side of a 4 mm thick float glass plate. Starting from the glass surface, there follow in sequence the materials listed hereunder, the number in parentheses being the thickness of the coating expressed in mm: $SnO_2$ (30), ZnO (2), Ag (13), $TiO_2$ (2.6), $SnO_2$ (40).

Focused upon the coating system was a laser beam of the wavelength of 1064 nm of a Q-switched Nd:YAG laser, to which end the original beam having a diameter of 1 mm and a Gaussian intensity profile traversed in sequence a 1:4 beam expander and a convergent lens of a focal length of 30 mm. In this manner, distinctly separate sites were exposed to a single pulse of a duration of 200 ns and energy varying between 0.3 mJ and 12 mJ.

Figure 1:
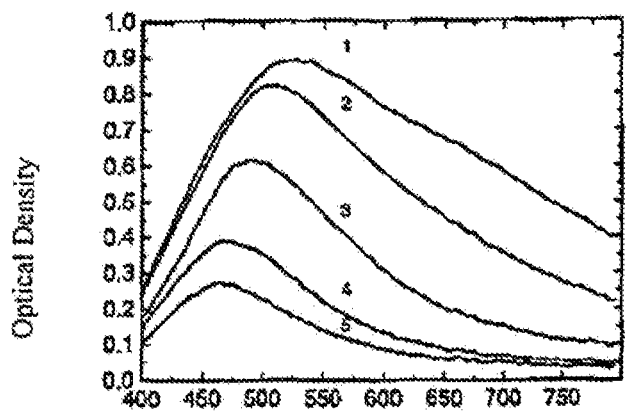
FIGS. 1-5 show graphs disclosing the optical properties associated with various other embodiments of the disclosed inventions.
Figure 2:
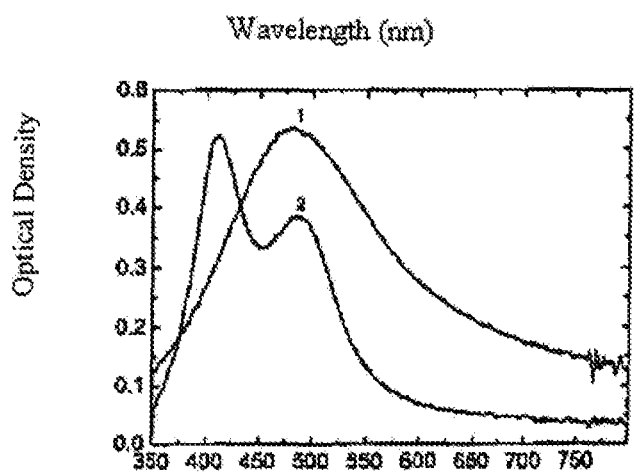

As a result, pixels were formed with a diameter of some 100 μm. FIG. 1 represents the microscopically measured spectrum photometer optical density in the center of the pixel as a function of the wavelength, whereby the consecutive numeration of the curves corresponds to the heightened energy of the individual pulses.

According to the invention, pixels possessing these characteristics may be transferred onto any surface at will.

In another exemplified embodiment, a color pixel was produced on a Low-E plate of the type described in Example 1, as explained in Exemplified embodiment 1, by means of a single pulse. Thereafter the plate was exposed to heat treatment of the duration of one hour at 600° C. Thereby the pixel undergoes a color change documented in FIG. 2 by the microscopically measured spectral photometric optical density at the center of the pixel before (Curve 1) and after (Curve 2) heat treatment.

Such a color change also occurs with a pixel transferred according to the invention to any surface at will, when such a surface is subsequently heat-treated as described.

According to the third exemplified embodiment, colored surfaces were produced of non-overlapping parallel lines onto the Low-E coating system described in Example 1 by the laser similarly described in the same example. With the laser held fixed, the lines were produced by the movement of the coating system along the focal plane at a speed of 2 mm/s and a pulse frequency of 1 kHz. In this instance, different from the first example, for the focusing of the laser beam a lens was used with a focal length of 70 mm.

Figure 3:
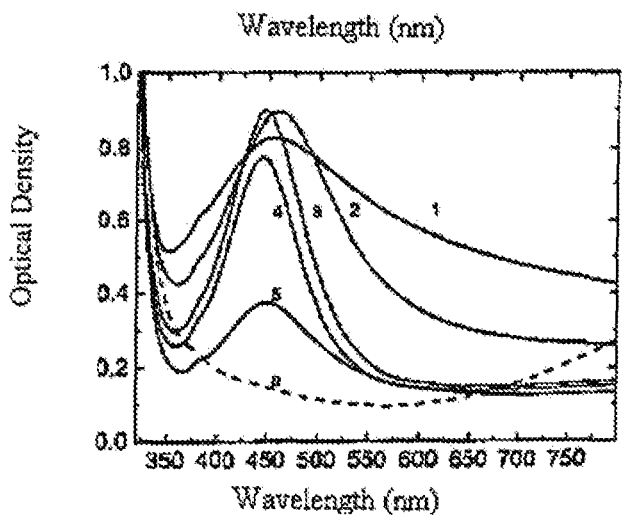
Figure 4:
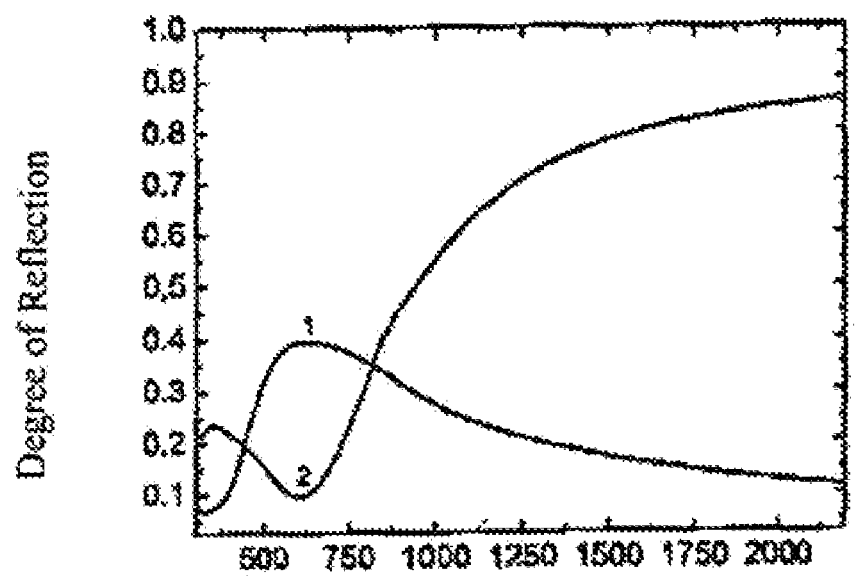

FIG. 3 illustrates a choice of optical densities measured on different surfaces as a function of the wavelength, whereby the sequential numbering of the curves again reflects the heightened energy of the pulses, varying between 0.3 mJ and 12 mJ. The dotted Curve a was measured in the untreated coating system. FIG. 4 represents an example of the wavelength dependence of the degree of reflection of one of the colored surfaces (Curve 1) along with the one of the untreated coating system (Curve 2). The measurement was effected with light impacting the coated side of the glass at an angle below 6°, meaning a virtually perpendicular incidence.

These properties apply also to the transfer of pixels.

Figure 5:
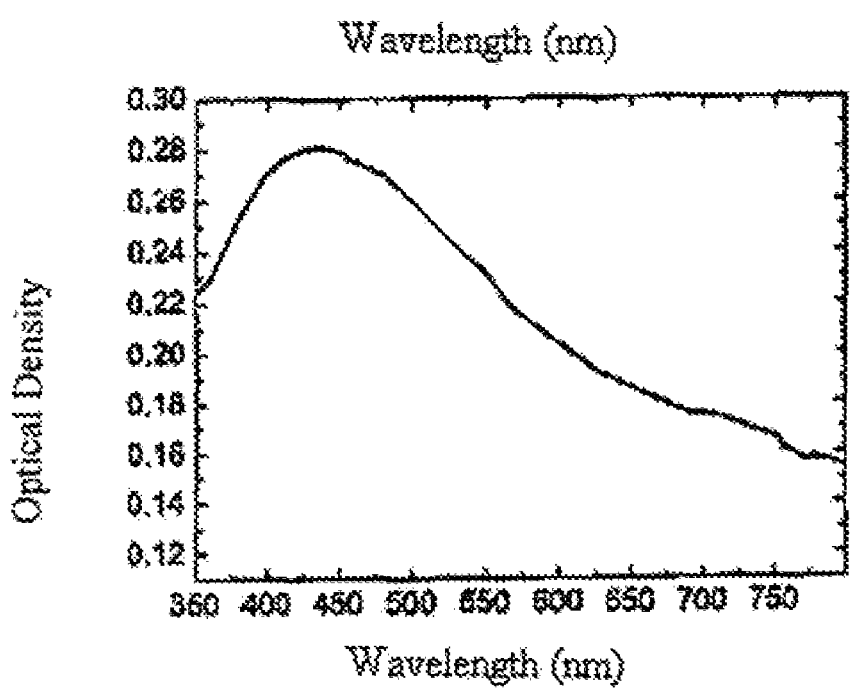

The base material for the fourth exemplified embodiment is a commercial Low-E plastic foil (PET) of the type of Heat Mirror® HM 55 of the firm of Southwall Europe GmbH, wherein the functional silver coating is embedded in indium (III) oxide for the purpose of eliminating reflections in the visible spectral range. The coating system was in contact with the surface of a conventional object carrier for microscopy and was outfitted with a commercial laser lettering device StarMark® SMC 65 (Rofin Co., Baasel Laseertech) with a lamp-pumped Nd:YAG laser rated at 65 W as the source of the beam, with a ten-digit 600 dpi resolution within 12s. The individual readings have a magnitude of 5.2 mm and a graduation of 0.6 mm. FIG. 5 shows the optical density of a number transferred as a numeral onto the object carrier and measured with a microscopic spectral photometer as a function of the wavelength.

The invention claimed is:

1. A process for marking an object surface, the process comprising
    arranging in contact with or at a spacing from the object surface a carrier element having on a side facing the object surface at least one metal coating embedded in other coatings, the coatings forming a Low-E coating system, and
    directing a laser beam at the coating system and thereby transferring laser irradiation material from the coating system to the object surface to be marked and adhering the laser irradiation material to the surface as a matrix of metallic nano-particles, whereby the matrix is formed of substances present at the outset in the coating system.

2. The process according to claim 1 wherein the laser irradiation material adhered to the surface has a color determined by the metal of the metal coating, silver or gold or copper being the metal.

3. The process according to claim 1, further comprising the step of
controlling a size of the metal nano-particles by varying a pulse duration, pulse energy, beam focusing, or relative velocity between surface of the object and the laser beam.

4. The process according to claim 1, further comprising the step during the laser irradiation of
positioning the coating system at a spacing from the object surface of up to 200 micrometers.

5. The process according to claim 1, further comprising the step when the object to be marked is transparent of
directing the laser beam through the object and the object surface to be marked onto the coating system.

6. The process according to claim 1, further comprising the step of
using a PET foil as the carrier element, and
shaping the carrier element to a curvilinear object surface.

7. The process according to claim 1, further comprising the step of
producing the markings by relatively moving the laser beam and the object surface.

8. The process according to claim 1, further comprising the step of
overlapping markings produced by one or more laser pulses such that a resulting color impression is varied by the degree of overlap.

9. The process according to claim 1, further comprising the step of
heating the marked object surface to change a color of the marking.

* * * * *